(12) United States Patent
Nakayama et al.

(10) Patent No.: US 9,960,407 B2
(45) Date of Patent: May 1, 2018

(54) SEALING ARRANGEMENT OF A BATTERY FILLING PORT USING A RIVET

(71) Applicants: Hiroyuki Nakayama, Toyota (JP); Takashi Harayama, Toyota (JP); Kazuyuki Kusama, Nagoya (JP)

(72) Inventors: Hiroyuki Nakayama, Toyota (JP); Takashi Harayama, Toyota (JP); Kazuyuki Kusama, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 149 days.

(21) Appl. No.: 14/360,140

(22) PCT Filed: Nov. 21, 2012

(86) PCT No.: PCT/IB2012/002429
§ 371 (c)(1),
(2) Date: May 22, 2014

(87) PCT Pub. No.: WO2013/076555
PCT Pub. Date: May 30, 2013

(65) Prior Publication Data
US 2014/0295259 A1 Oct. 2, 2014

(30) Foreign Application Priority Data

Nov. 25, 2011 (JP) ................. 2011-257683

(51) Int. Cl.
*H01M 2/36* (2006.01)
*H01M 10/052* (2010.01)
(Continued)

(52) U.S. Cl.
CPC ........... *H01M 2/362* (2013.01); *B21J 15/043* (2013.01); *F16B 19/008* (2013.01);
(Continued)

(58) Field of Classification Search
CPC ...................................................... H01M 2/365
See application file for complete search history.

(56) References Cited

U.S. PATENT DOCUMENTS

2002/0150813 A1* 10/2002 Park ..................... H01M 2/361
429/56
2003/0059278 A1* 3/2003 Kochiya ................. F16B 19/08
411/508
(Continued)

FOREIGN PATENT DOCUMENTS

JP 40-31882 11/1940
JP 52-161223 5/1951
(Continued)

OTHER PUBLICATIONS

Merriam Webster define taper, Jun. 7, 2016.*

*Primary Examiner* — Sarah A. Slifka
*Assistant Examiner* — Brian R Ohara
(74) *Attorney, Agent, or Firm* — Finnegan, Henderson, Farabow, Garrett & Dunner, LLP

(57) ABSTRACT

A sealed battery includes a filling hole, and a gasket and a blind rivet that seal the filling hole. A tapered surface that is inclined toward an inside of a battery case is formed around the filling hole of the battery case. The filling hole is sealed by the gasket and the blind rivet by the blind rivet plastic deforming.

7 Claims, 9 Drawing Sheets

(51) Int. Cl.
  *F16B 19/00* (2006.01)
  *F16B 19/10* (2006.01)
  *B21J 15/04* (2006.01)

(52) U.S. Cl.
  CPC ......... *F16B 19/1045* (2013.01); *H01M 2/36* (2013.01); *H01M 2/365* (2013.01); *H01M 2/361* (2013.01); *H01M 10/052* (2013.01)

(56) References Cited

U.S. PATENT DOCUMENTS

| | | | | |
|---|---|---|---|---|
| 2003/0098550 | A1* | 5/2003 | Groh | F16J 15/061 |
| | | | | 277/630 |
| 2004/0161666 | A1* | 8/2004 | Haas | H01M 2/0404 |
| | | | | 429/185 |
| 2005/0160562 | A1* | 7/2005 | Hasegawa | A44B 1/44 |
| | | | | 24/94 |
| 2010/0304194 | A1* | 12/2010 | Boucher | H01M 2/361 |
| | | | | 429/50 |
| 2010/0304214 | A1 | 12/2010 | Itoh et al. | |
| 2011/0072648 | A1* | 3/2011 | Yamauchi | H01M 2/36 |
| | | | | 29/623.2 |

FOREIGN PATENT DOCUMENTS

| | | |
|---|---|---|
| JP | 4-63559 | 5/1992 |
| JP | 2003-229118 | 8/2003 |
| JP | 2010-277936 | 12/2010 |
| JP | 2013-89359 | 5/2013 |

\* cited by examiner

SEALING ARRANGEMENT OF A BATTERY FILLING PORT USING A RIVET

CROSS-REFERENCE TO RELATED APPLICATIONS

This application is a national phase application of International Application No. PCT/IB2012/002429, filed Nov. 21, 2012, and claims the priority of Japanese Application No. 2011-257683, filed Nov. 25, 2011, the content of both of which is incorporated herein by reference.

BACKGROUND OF THE INVENTION

1. Field of the Invention

The invention relates to a sealed battery, and more particularly, to technology for sealing a through-hole open in a battery case.

2. Description of the Related Art

For a sealed battery such as a lithium-ion secondary battery or a nickel-metal-hydride secondary battery, a structure is typically known in which charge and discharge elements (such as a positive electrode, a negative electrode, and a separator and the like) are housed inside a battery case, and a filling hole that is a through-hole open in a cover portion is sealed after the battery case has been filled with electrolyte.

Japanese Patent Application Publication No. 2003-229118 (JP 2003-229118 A), for example, describes technology for sealing such a through-hole according to a method that involves using a blind rivet having a flange and a sleeve as a plug member, and sealing the through-hole by inserting the sleeve into the through-hole and then elastically deforming this sleeve so as to compress a gasket arranged between the flange and the through-hole, as shown in FIG. 9A.

However, with the plug member described in JP 2003-229118 A, when internal pressure of the battery rises, the area around the through-hole of the cover portion may deform outward, such that an inner peripheral end portion of the cover portion presses the gasket upward, as shown in FIG. 9B. At this time, the gasket is pushed out by radially outward force from the cover portion, as shown by arrows F0 in FIG. 9B. As a result, contact with the sleeve of the blind rivet becomes weak, possibly resulting in a decrease in strength and seal performance of the sealing portion.

SUMMARY OF THE INVENTION

The invention thus provides a sealed battery capable of inhibiting a decrease in strength and seal performance of the sealing portion, even if the area around the through-hole deforms outward due to a rise in the internal pressure of the battery.

That is, one aspect of the invention relates to a sealed battery that includes a battery case with an open through-hole, a plug member that plugs the through-hole, and a seal member that is an elastic body that seals between the through-hole and the plug member. The plug member is a blind rivet that includes a flange formed with a diameter larger than a diameter of the through-hole, and a sleeve formed with a diameter smaller than the diameter of the through-hole. A tapered surface that is inclined toward an inside of the battery case is formed on a peripheral portion of the through-hole of an outside surface of the battery case. Also, the seal member is sandwiched between the flange and the tapered surface, and the through-hole is sealed by the flange, by a portion of the sleeve that is inserted into an inside the battery case being plastic deformed so as to bulge out.

In the aspect described above, the through-hole may be a filling hole for filling electrolyte.

In the structure described above, the tapered surface of the peripheral portion of the through-hole that is formed on the outside surface of the battery case may be formed only on the outside surface of the battery case.

In the structure described above, a tapered portion in which a radial inside of the flange is inclined toward the battery case may be formed on a surface of the flange that opposes the through-hole.

In the structure described above, a tapered portion in which a radial inside of the flange is inclined in a direction opposite the battery case may be formed on a surface of the flange that opposes the through-hole.

In the structure described above, the seal member may be formed in a shape that matches a shape between the tapered surface and a surface of the flange that opposes the through-hole when the through-hole is sealed by the flange.

Also, in the structure described above, a protruding portion may be formed on at least one of the tapered surface and a surface of the flange that opposes the through-hole.

The sealed battery of the invention thus makes it possible to inhibit a decrease in strength and seal performance of the sealing portion, even if the area around the through-hole deforms outward due to a rise in the internal pressure of the battery.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
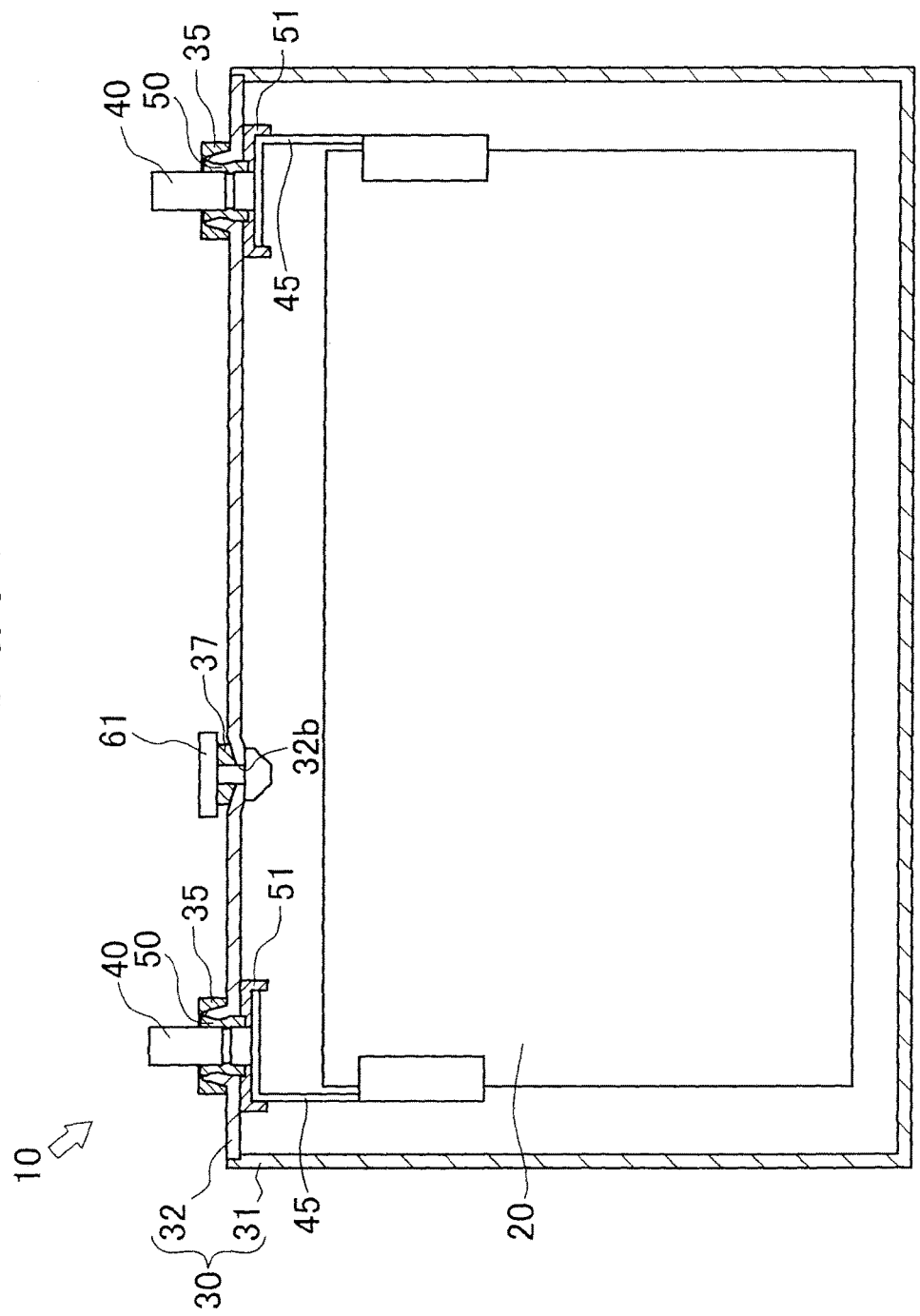
FIG. 1 is a front sectional view schematically showing the structure of a sealed battery according to a first example embodiment of the invention.

Next, example embodiments of the invention will be described. The technical scope of the invention is not limited to the example embodiments described below. To the contrary, the invention made apparent from the description in the specification and the accompanying drawings broadly covers the entire scope of truly intended technical aspects.

First Example Embodiment

The general structure of a battery 10 that is a first example embodiment of the battery of the invention will be described with reference to FIG. 1. The battery 10 of this example embodiment is a sealed lithium-ion secondary battery. However, the object to which the invention may be applied is not limited to a lithium-ion secondary battery. That is, the invention may also be applied to another type of sealed battery such as a nickel-metal-hydride secondary battery.

The battery 10 includes a power generating element 20, an exterior 30 that is a battery case inside of which the power generating element 20 is housed, external terminals 40 that protrude outward from the exterior 30, and insulating members 50 and 51 interposed between each of the external terminals 40 and the exterior 30.

The power generating element 20 is an electrolyte-impregnated electrode body in which positive electrode, a negative electrode, and a separator are stacked or rolled together. When the battery 10 charges and discharges, current flows as a result of a chemical reaction that takes place inside of the power generating element 20 (strictly speaking, as a result of ions traveling through the electrolyte between the positive electrode and the negative electrode).

The exterior 30 that is the battery case is a rectangular column-shaped canister having a housing portion 31 and a cover portion 32. The housing portion 31 is an open rectangular tube-shaped member with a bottom and one side that is open. The power generating element 20 is housed inside of this housing portion 31. The cover portion 32 is a plate-shaped member that has a shape corresponding to the open side of the housing portion 31, and is able to be joined with the housing portion 31 so as to close off the open side of the housing portion 31. A filling hole 32b for pouring in electrolyte is open in the cover portion 32, between locations where the external terminals 40 are inserted through the cover portion 32. The battery 10 in this example embodiment is formed by a rectangular battery in which the exterior 30 is formed in a rectangular tube-shape with a bottom, but the invention is not limited to this. For example, the invention may also be applied to a round cylindrical battery in which the exterior 30 is formed in a round cylindrical shape with a bottom.

Each of the external terminals 40 is arranged such that a portion thereof protrudes outward from the battery 10 from an outside surface of the cover portion 32. Each of the external terminals 40 is electrically connected to a positive electrode or a negative electrode of the power generating element 20 via a corresponding collector terminal 45. The external terminals 40 and the collector terminals 45 function as energizing paths that take electric power stored in the power generating element 20 out to an external portion, or bring in electric power from an external portion to the power generating element 20. Each of the collector terminals 45 is connected to a positive electrode plate or a negative electrode plate of the power generating element 20. As the material of the collector terminals 45, aluminum may be used on the positive electrode side, and copper may be used on the negative electrode side.

Each of the external terminals 40 is fixed in an insulated state to the cover portion 32 via the insulating members 50 and 51 by a fixing member 35 being placed over an outer peripheral surface portion of the external terminal 40. The material of the insulating members 50 and 51 is preferably material having an excellent high-temperature creep property, i.e., material having long-term creep resistance with respect to a thermal cycle of the battery 10. An example of such material is PFA (perfluoroalkoxy ethylene) or the like.

The external terminals 40 are threaded by thread-rolling a portion that protrudes outward from the battery 10, such that bolt portions are formed. When the battery 10 is actually used, connecting terminals of an external device or a bus bar or the like are fastened to the external terminals 40 using these bolt portions. During fastening, fastening torque is applied to the external terminals 40, and external force is applied in the axial direction by screw fastening, so high-strength material such as iron is preferably used as the material of the external terminals 40.

Next, the structure of the area near the filling hole 32b that is the through-hole that is open in the battery 10 according to this example embodiment will be described with reference to FIG. 2. The filling hole 32b is formed open in the cover portion 32 in a position between the external terminals 40, as described above. The filling hole 32b is a through-hole having a predetermined inside diameter, and passes through the cover portion 32 in the direction of thickness of the cover portion 32. The filling hole 32b is used to fill electrolyte into the exterior 30 within which the power generating element 20 has been housed in advance.

Figure 2:
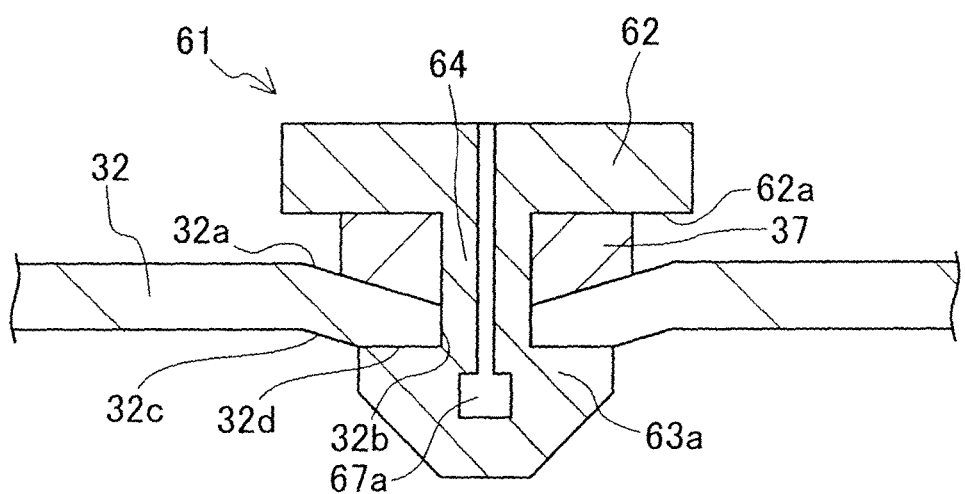
FIG. 2 is a sectional view of the structure near a filling hole according to the first example embodiment.

A blind rivet 61 that is a plug member, and a gasket 37 that is a seal member with an elastic body that seals between the filling hole 32b and the blind rivet 61, are installed in the filling hole 32b, as shown in FIGS. 1 and 2. In this example embodiment, the structure is such that the filling hole 32b for filling the electrolyte is a through-hole, and this filling hole 32b is sealed, but the through-hole that is sealed by applying the invention is not limited to the filling hole 32b. That is, the invention may be applied as long as the through-hole is a through-hole that is open in the battery case.

A tapered surface 32a that is inclined toward the inside of the battery case (i.e., downward in FIG. 2) is formed around the filling hole 32b (i.e., on an inner peripheral end portion of the cover portion 32) on an outside surface (i.e., the upper surface in FIG. 2) of the cover portion 32 that is the battery case. Also, a tapered surface 32c that is inclined toward the inside of the battery case similar to the tapered surface 32a is formed on a portion of a back side (i.e., the inside of the cover portion 32) of the tapered surface 32a, and a surface 32d that is level with (i.e., parallel to) the cover portion 32 is formed even farther radially inward of the tapered surface 32c. Also, as shown in FIG. 2, the gasket 37 that is an annular-shaped elastic body is arranged so as to abut against the tapered surface 32a. The gasket 37 is a seal member that seals the filling hole 32b. The material of this gasket 37 is preferably resistant to electrolyte, such as fluorine resin or EPDM (ethylene-propylene rubber) or the like, for example. The gasket 37 has an insertion hole into which a sleeve 64 is inserted, in the center. The gasket 37 also has an inclined portion formed on a surface that contacts the tapered surface 32a, and is positioned between a lower surface 62a of the blind rivet 61 and the tapered surface 32a of the cover portion 32.

The blind rivet 61 includes a flange-shaped flange 62 that is a plug portion formed with a larger diameter than the diameter of the filling hole 32b, a cylindrical sleeve 64 that is formed with substantially the same diameter as the diameter of the filling hole 32b and is inserted into the filling hole 32b, and a bulging head portion 63a that extends from the sleeve 64 and has a larger diameter than the diameter of the sleeve 64, as shown in FIG. 2. Also, the blind rivet 61 is crimped to the cover portion 32 with the annular gasket 37 sandwiched between the flange 62 and the cover portion 32. That is, the blind rivet 61 seals the filling hole 32b with the annular gasket 37 compressed between the surrounding portion of the filling hole 32b and the blind rivet 61.

Figure 3:
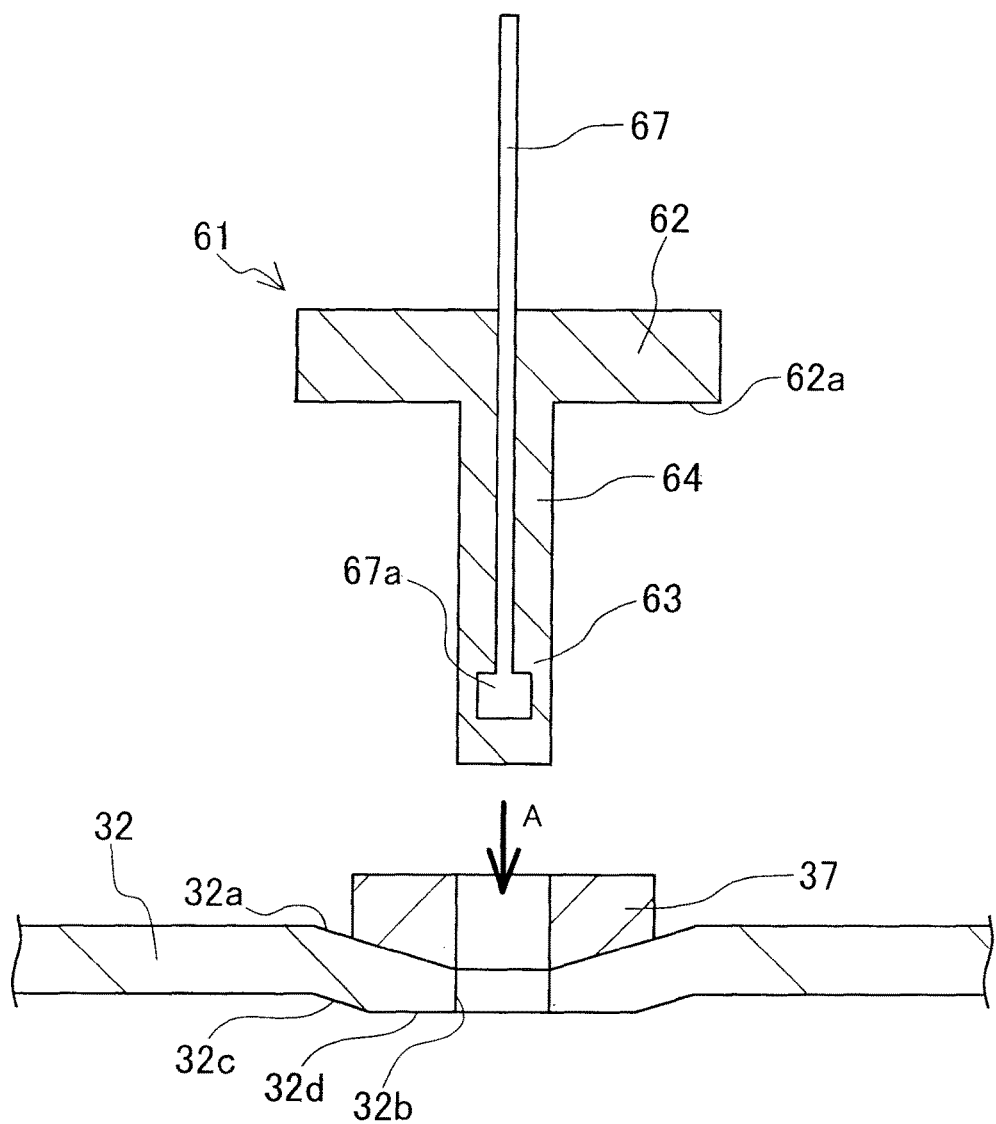
FIG. 3 is a sectional view illustrating a state of the area near the filling hole before insertion of a blind rivet according to the first example embodiment.

Before sealing the filling hole 32b, the blind rivet 61 is formed of the flange-shaped flange 62, the cylindrical sleeve 64 that is able to be inserted into the filling hole 32b, a bulging portion 63 that is a mid portion of the sleeve 64 and has substantially the same diameter as the sleeve 64, and a mandrill 67 that is housed in the sleeve 64 and extends out from the flange 62, as shown in FIG. 3. One end portion of the mandrill 67 extends out a fixed length from the flange 62, and a head portion 67a that has a larger diameter than the one end portion is formed on the other end portion of the mandrill 67. The head portion 67a is arranged near the bulging portion 63.

Figure 4:
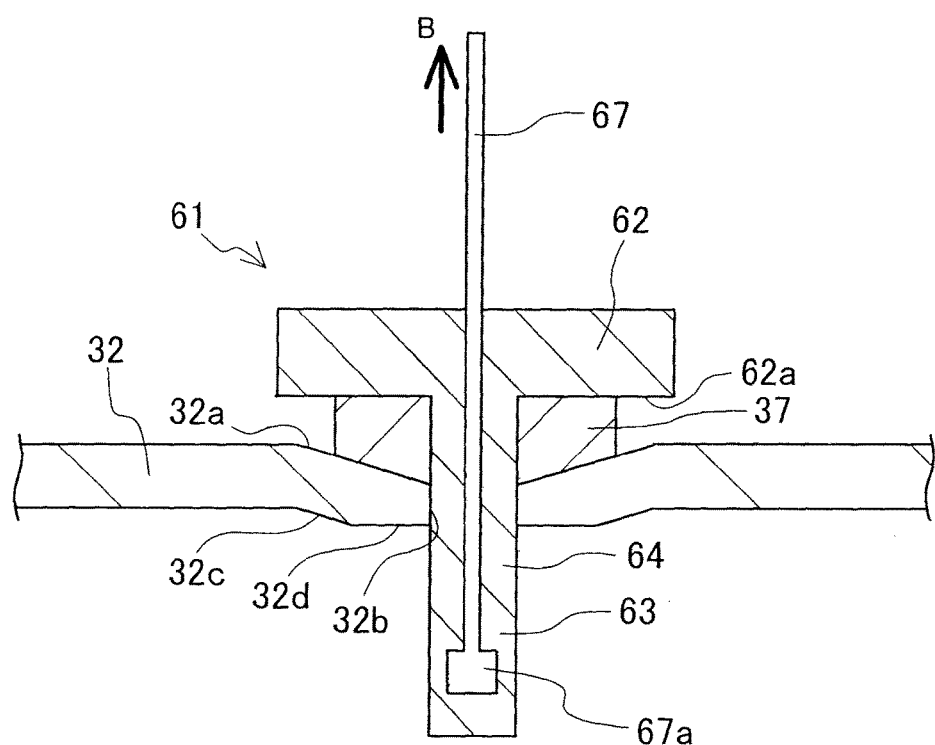
FIG. 4 is a sectional view illustrating a state of the area near the filling hole after insertion of the blind rivet according to the first example embodiment.

When sealing the filling hole 32b with the blind rivet 61, the blind rivet 61 is moved in the direction of arrow A in FIG. 3, the sleeve 64 is inserted into the insertion hole of the gasket 37 and the filling hole 32b, and the bulging portion 63 is inserted into the inside of the exterior 30, as shown in FIG. 4.

Then the head portion 67a elastically deforms the bulging portion 63 that has been inserted into the inside of the exterior 30 so that it becomes like the bulging head portion 63a in FIG. 2, by pulling the portion of the mandrill 67 that extends out from the flange 62 in the direction indicated by arrow B in FIG. 4 with a fastening tool or the like. Further, after the bulging head portion 63a of a certain size has been formed, the portion of the mandrill 67 that extends out from the flange 62 is broken off and discarded.

In this way, the blind rivet 61 seals the filling hole 32b by sandwiching the cover portion 32 and the gasket 37 between the flange 62 and the bulging head portion 63a, consequently connecting these together. This completes the sealed battery 10 with the exterior 30 in a sealed state.

The battery 10 according to this example embodiment makes it possible to inhibit a decrease in strength and seal performance of the sealing portion by the blind rivet 61, even if the area around the filling hole 32b deforms outward due to a rise in the internal pressure as a result of gas being produced inside the battery 10.

Figure 5:
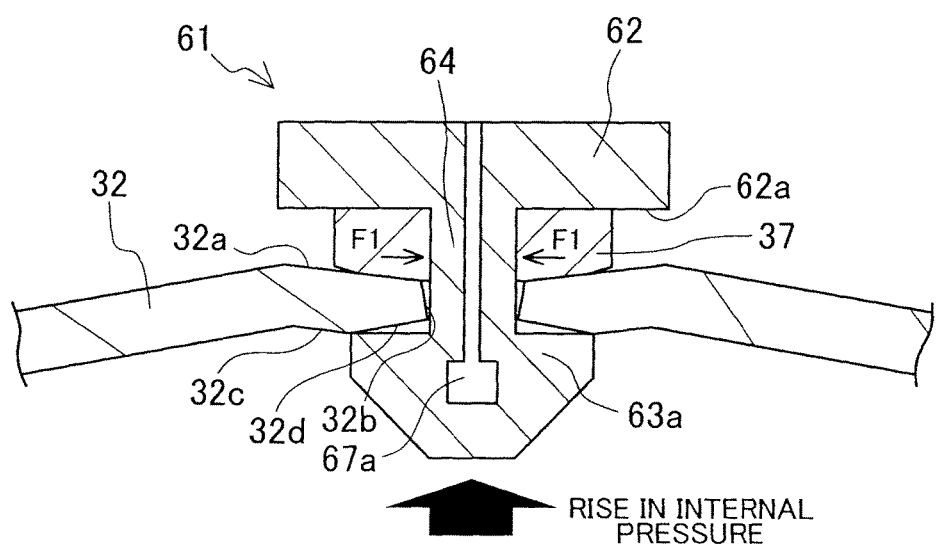
FIG. 5 is a sectional view of the area near the filling hole when the internal pressure in the sealed battery has risen according to the first example embodiment.

FIG. 5 is a view of the sealing portion when the internal pressure of the battery 10 rises. When the area around the filling hole 32b of the cover portion 32 deforms toward the outside of the battery 10 (i.e., upward in FIG. 5), the gasket 37 is compressed upward by the entire surface of the tapered surface 32a, because the tapered surface 32a is formed on a portion of the cover portion 32 that abuts against the gasket 37. As a result, the gasket 37 receives radially inward force from the tapered surface 32a, as shown by arrows F1 in FIG. 5, and is thus compressed toward the sleeve 64 of the blind rivet 61. That is, in this example embodiment, when the area around the filling hole 32b deforms toward the outside of the battery 10, the contact between the gasket 37 and the sleeve 64 increases, making it possible to inhibit a decrease in strength and seal performance of the sealing portion by the blind rivet 61.

As described above, with the battery 10 according to this example embodiment, the filling hole 32b is sealed by the blind rivet 61. Therefore, even if excess gas is produced inside of the exterior 30 that is the battery case as a result of the activation process of the battery 10, the seal by the sealing portion is still able to be ensured. In addition, the tapered surface 32a is formed on a peripheral portion of the filling hole 32b, and is inclined toward the inside of the battery case. Therefore, even if electrolyte spills on the tapered surface 32a, the electrolyte is able to flow along the slope of the tapered surface 32a and into the battery 10.

Also, in the battery 10 according to this example embodiment, as shown in FIG. 3, when the filling hole 32b is sealed by the flange 62, the gasket 37 is formed in a shape that matches the shape created when the tapered surface 32a and the lower surface 62a of the flange 62 are brought close together. As a result, the contact between the gasket 37 and the tapered surface 32a increases, so the gasket 37 more easily receives the force from the tapered surface 32a. Therefore, the amount that the gasket 37 is compressed toward the sleeve 64 increases, so the contact between the gasket 37 and the sleeve 64 becomes even stronger. That is, it is possible to even more effectively inhibit a decrease in the strength and seal performance of the sealing portion by the blind rivet 61.

Second Example Embodiment

Next, a sealed battery according to a second example embodiment of the invention will be described with reference to FIG. 6. Portions of the sealed battery described in this second example embodiment that are common to portions of the sealed battery described in the first example embodiment above will be denoted by like reference characters, and descriptions of those portions will be omitted.

Figure 6A:
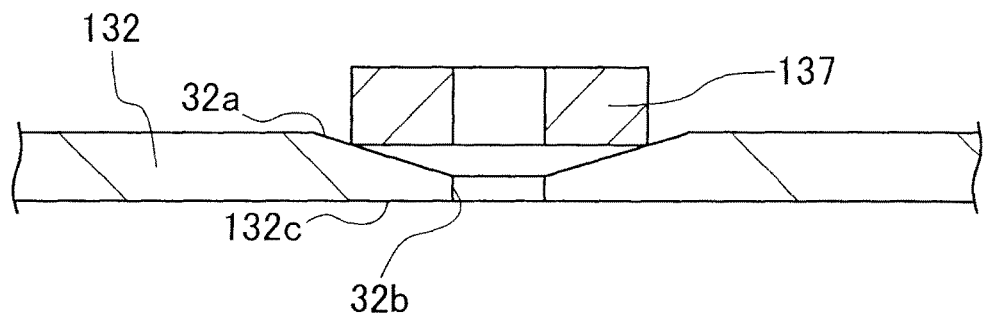
FIG. 6A is a sectional view of an area near a filling hole before insertion of a blind rivet in a sealed battery according to a second example embodiment of the invention.
Figure 6B:
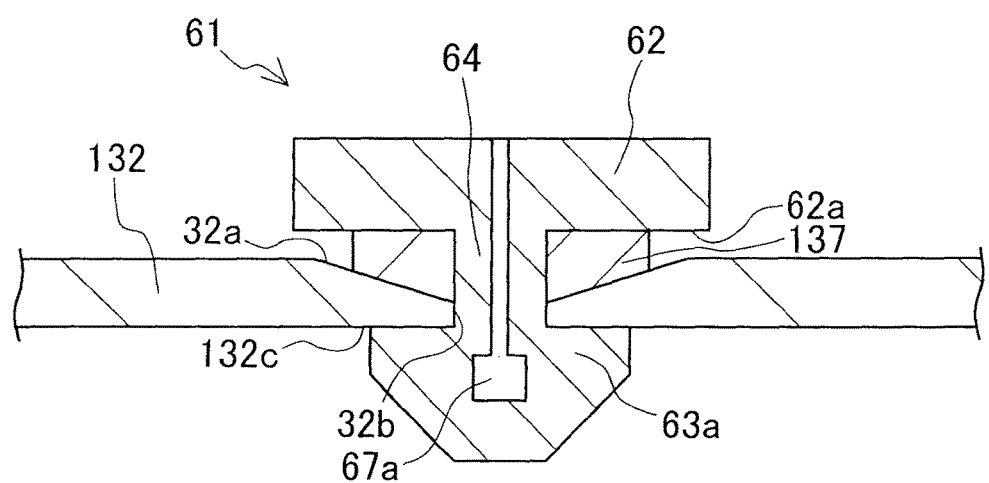
FIG. 6B is a sectional view of the area near the filling hole after attachment of the blind rivet according to the second example embodiment.

In the sealed battery according to the second example embodiment, an inside surface (i.e., the surface on the lower side in FIG. 6A) 132c of a cover portion 132 does not protrude toward the inside of the battery container, but instead has a flat shape similar to other portions, as shown in FIG. 6A. As a result, the vertical width of the sealing portion by the blind rivet 61 is more compact, as shown in FIG. 6B, than it is in the first example embodiment described above (see FIG. 2).

Also, in this example embodiment, a gasket 137 is formed having a round cylindrical shape in which upper and lower surfaces thereof are parallel, as shown in FIG. 6A. Also, as shown in FIG. 6B, when the cover portion 132 and the gasket 137 are sandwiched between the flange 62 and the bulging head portion 63a by the blind rivet 61, the gasket 137 is elastically deformed into a shape matching the shape created when the tapered surface 32a and the lower surface 62a of the flange 62 are brought close together, and is sandwiched between the tapered surface 32a and the lower surface 62a. This structure obviates the need for machining to make the shape of the gasket 137 a shape that matches the tapered surface 32a.

Third Example Embodiment

Figure 7A:
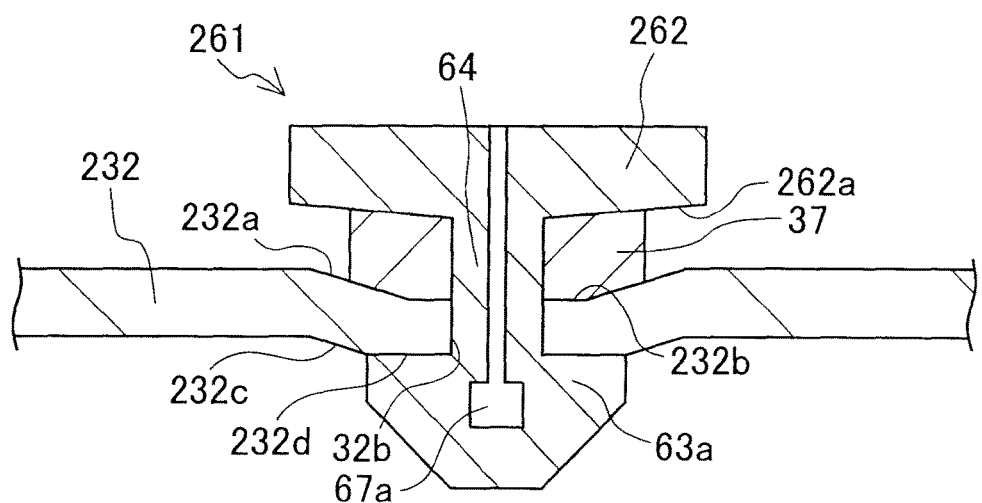
FIGS. 7A and 7B are sectional views of an area near a filling hole after attachment of a blind rivet in a sealed battery according to third and fourth example embodiments, respectively, of the invention.

Next, a sealed battery according to a third example embodiment of the invention will be described with reference to FIG. 7A. In the sealed battery according to this example embodiment, a tapered surface 232a that is inclined toward an inside of battery case is formed on a portion of a peripheral portion of the filling hole 32b on an upper surface of a cover portion 232, and a level surface 232b is formed even farther to the radial inside of this tapered surface 232a. Also, a tapered surface 232c that is inclined toward the inside of the battery case similar to the tapered surface 232a is formed on a portion of a back side (i.e., the inside of the cover portion 232) of the tapered surface 232a, and a level surface 232d is formed even farther to the radial inside of this tapered surface 232c.

Further, a tapered surface 262a in which a radial inside of a flange 262 is inclined toward the cover portion 232 is formed on a surface of the flange 262 of the blind rivet 261 that opposes the filling hole 32b. In this example embodiment, the shape of the tapered surface 232a of the cover portion 232 and the shape of the flange 262 change according to the shape of a product, as described above. Therefore, the degree of freedom when designing the shape of a product is greater.

Fourth Example Embodiment

Figure 7B:
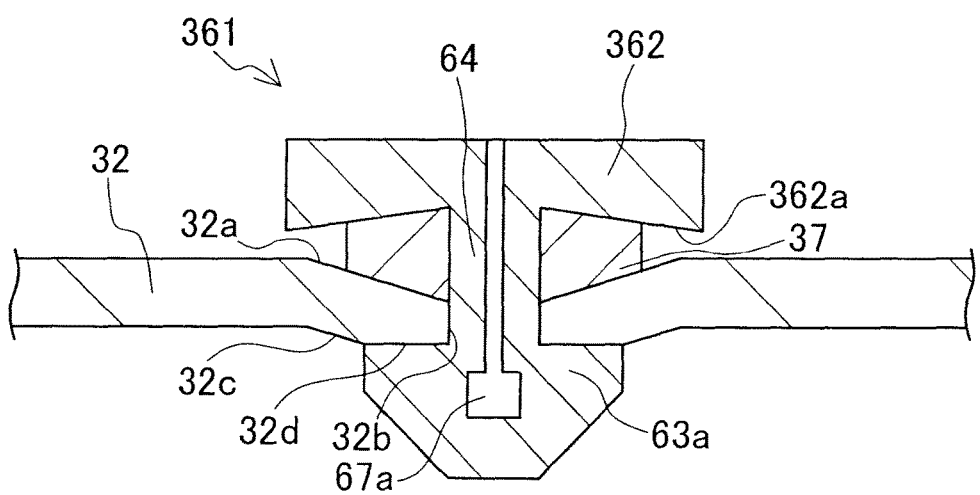

Next, a sealed battery according to a fourth example embodiment of the invention will be described with reference to FIG. 7B. In the sealed battery of this example embodiment, a tapered portion 362a in which a side of the sleeve 64 (i.e., the radial inside of a flange 362) is inclined in the direction opposite the battery case (i.e., in a direction opposite the cover portion 32) is formed on a surface of the flange 362 of the blind rivet 361 that opposes the filling hole 32b, as shown in FIG. 7B.

Figure 8A:
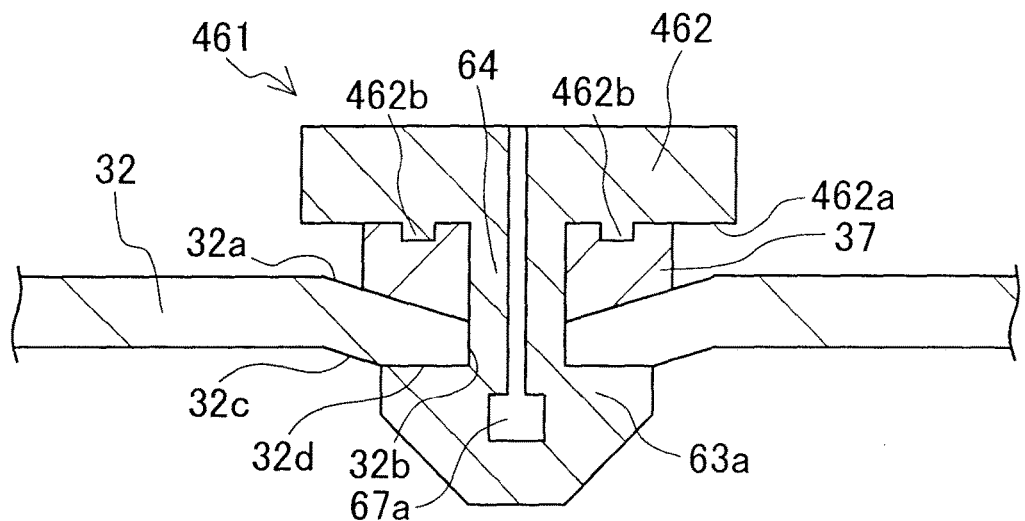
FIGS. 8A and 8B are sectional views of an area near a filling hole after attachment of a blind rivet in a sealed battery according to fifth and sixth example embodiments, respectively, of the invention.
Figure 8B:
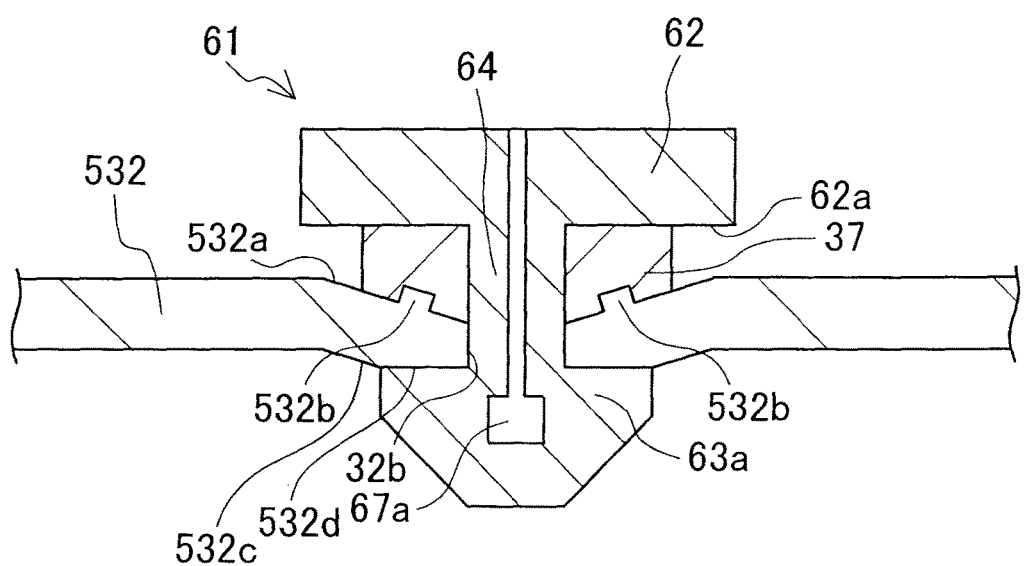
Figure 9A:
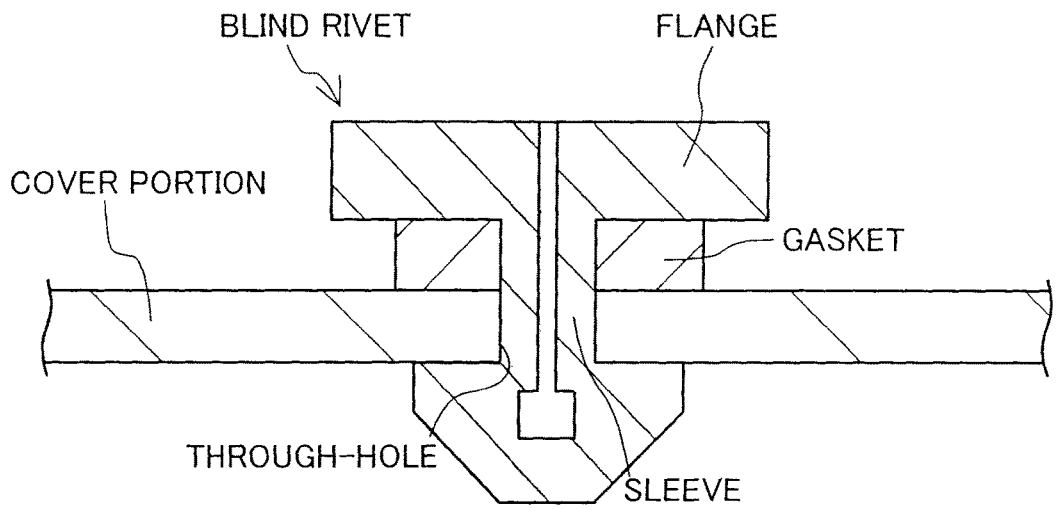
FIG. 9A is a sectional view of an area near a filling hole after attachment of a blind rivet in a sealed battery according to related art.
Figure 9B:
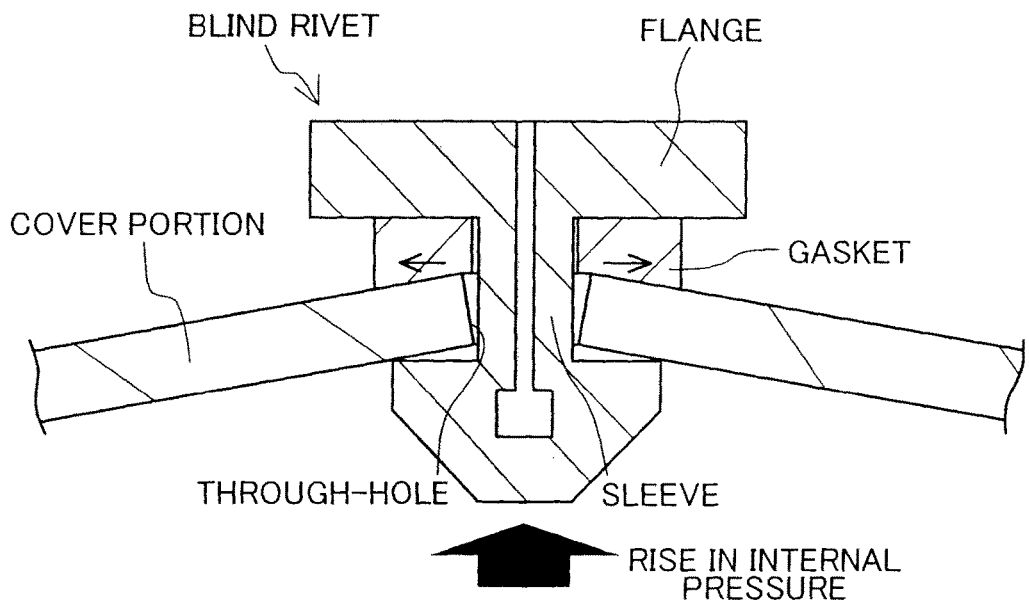
FIG. 9B is a sectional view of the area near the filling hole when the internal pressure of the sealed battery according to the related art has risen.

According to this example embodiment, the structure described above enables the force from the tapered surface 32a that is received by the gasket 37 to be even greater when the area around the filling hole 32b of the cover portion 32 deforms toward the outside of the battery 10 due to a rise in the internal pressure of the battery 10 (see FIG. 5). That is, the elastic force from the deformation of the gasket 37 becomes reaction force received from the tapered portion 362a, so the radially inward force that is applied to the sleeve 64 by the gasket 37 is even greater. As a result, the contact between the gasket 37 and the sleeve 64 is even stronger, thus enabling a decrease in the strength and seal performance of the sealing portion by the blind rivet 61 to be even more effectively inhibited Fifth and Sixth Example Embodiments Next, sealed batteries according to fifth and sixth example embodiments of the invention will be described with reference to FIGS. 8A and 8B. In the sealed battery according to the fifth example embodiment, annular protruding portions 462b are formed on a lower surface 462a that is a surface of a flange 462 that opposes the filling hole 32b, as shown in FIG. 8A. Also, in the sealed battery according to the sixth example embodiment, annular protruding portions 532b are formed on a tapered surface 532a of a cover portion 532, as shown in FIG. 8B.

The protruding portions 462b (532b) in these example embodiments may also be provided on both the lower surface 462a that is the surface of the flange 462 that opposes the filling hole 32b, and the tapered surface 532a of the cover portion 532. Also, the protruding portions 462b (532b) do not have to be annular, but may also be point-like protruding portions or protruding portions having a rectangular column-shape.

According to this example embodiment, with the structure described above, the gasket 37 is elastically deformed by the protruding portions 462b (532b), such that the compressibility increases, when the cover portion 32 (532) and the gasket 37 are sandwiched between the flange 462 (62) and the bulging head portion 63a by the blind rivet 461 (61). Therefore, deformation of the gasket 37 is promoted when the area around the filling hole 32b of the cover portion 32 (532) deforms toward the outside of the battery 10 due to a rise in internal pressure of the battery 10 (see FIG. 5). That is, the radially inward force applied to the sleeve 64 by the gasket 37 becomes even greater, so the contact between the gasket 37 and the sleeve 64 becomes even stronger, and as a result, a decrease in the strength and seal performance of the sealing portion by the blind rivet 461 (61) is able to be even more effectively inhibited.

The invention claimed is:

1. A sealed battery comprising:
a battery case comprising a cover portion with an open through-hole;
a plug member that plugs the through-hole; and
a seal member that is an elastic body that seals between the through-hole and the plug member, wherein
the plug member is a blind rivet that includes a flange formed with a diameter larger than a diameter of the through-hole, and a sleeve formed with a diameter smaller than the diameter of the through-hole;
a tapered surface that is inclined toward an inside of the battery case is formed on a peripheral portion of the through-hole of an outside surface of the battery case, the tapered surface being inclined at the same angle throughout the tapered surface from a level portion of the cover portion to an inner wall surface of the through-hole, the inner wall surface extending parallel to the axial direction of the through-hole; and
the seal member is sandwiched between the flange and the tapered surface, and the through-hole is sealed by the flange, by a portion of the sleeve that is inserted into the inside of the battery case being plastic deformed so as to bulge out.

2. The sealed battery according to claim 1, wherein the through-hole is a filling hole for filling electrolyte.

3. The sealed battery according to claim 1, wherein the tapered surface of the peripheral portion of the through-hole that is formed on the outside surface of the battery case is formed only on the outside surface of the battery case.

4. The sealed battery according to claim 1, wherein the flange includes a surface that opposes the through-hole and is inclined toward the battery case from a radial outside of the flange toward a radial inside of the flange.

5. The sealed battery according to claim 1, wherein the flange includes a surface that opposes the through-hole and is inclined away from the battery case from a radial outside of the flange toward a radial inside of the flange.

6. The sealed battery according to claim 1, wherein the seal member is formed in a shape that matches a shape between the tapered surface and a surface of the flange that opposes the through-hole when the through-hole is sealed by the flange.

7. The sealed battery according to claim 1, wherein a protruding portion is formed on at least one of the tapered surface and a surface of the flange that opposes the through-hole.

* * * * *